United States Patent Office

2,903,492
Patented Sept. 8, 1959

2,903,492

PRODUCTION OF CYCLO-OCTANE

Otto Schlichting and Walter Schweter, Ludwigshafen (Rhine), Germany, assignors to Badische Anilin- & Soda-Fabrik Aktiengesellschaft, Ludwigshafen (Rhine), Germany No Drawing. Application November 5, 1957
Serial No. 694,489

Claims priority, application Germany November 9, 1956

6 Claims. (Cl. 260—666)

This invention relates to a process for the production of cyclo-octane by catalytic hydrogenation of cyclo-octatetraene. In particular the invention relates to a process for the perhydrogenation of cyclo-octatetraene under increased hydrogen pressure according to which operation is in the neutral range in the presence of new catalysts.

It is already known to prepare cyclo-octane by catalytic hydrogenation of cyclo-octatetraene under increased pressure and at elevated temperature. According to this process a catalyst is used which contains iron, cobalt, nickel or copper as the active constituent.

Yields of cyclo-octane are obtained which fluctuate between 80 and 90% of the theoretical yield. As a byproduct in the hydrogenation of cyclo-octatetraene according to the known methods there is formed above all bicyclo-(0.2.4)-octane in amounts of 10 to 20%. The formation of this byproduct not only reduces the yield of cyclo-octane, but renders more difficult the purification of the hydrogenation product by distillation. In order to obtain a pure cyclo-octane free from bicyclo-(0.2.4)-octane it is necessary to work with especially efficient columns.

If the hydrogenation according to the said method is carried out in a continuous manner, a subsidence in the activity of the catalyst is observed within a short time by reason of resinous deposits.

We have now found that in the production of cyclo-octane by catalytic hydrogenation of cyclo-octatetraene at elevated temperature and under increased pressure, both the formation of byproducts which have a troublesome action in the distillative working up of the hydrogenation mixture and the clogging of the catalyst are avoided by carrying out the hydrogenation in the neutral range with a nickel-copper catalyst which additionally contains a metal from the group consisting of manganese and chromium and which is applied to a neutral and finely-pored carrier.

Suitable catalysts are nickel-copper catalysts which contain 10 to 20% of nickel and 1 to 8% of copper and to which 0.5 to 5% by weight of a metal from the group consisting of manganese and chromium has been added. These active components are applied to a neutral and finely-pored carrier.

The catalysts are made by treating the carrier substance with an aqueous solution of the salts of the active components, it being immaterial whether the salts are applied one after another in a plurality of solutions or whether the salts are all combined and applied simultaneously in one solution. The preferred salt form of the metals are their nitrates. The impregnated carriers are then treated at raised temperature in conventional manner.

As a neutral and finely-pored carrier aluminum oxide or calcium or sodium zeolites may for example be used. The synthetic zeolites are to be preferred to those which occur naturally. By finely-pored carriers for these catalysts there are to be understood carriers which exhibit very many micropores and very few macropores and moreover have an internal surface which is as large as possible. For example an aluminum oxide carrier is suitable which has the following properties:

Aluminium oxide—Many micropores, large internal surface, few macropores.
　Inner surface—
　　without catalyst, 277.4 square meters per gram.
　　with 20% catalyst, 117.5 square meters per gram.
　Mean pore radius—
　　without catalyst, 37.6 Angstrom units.
　　with 20% catalyst, 58.7 Angstrom units.
　Micropore volume—
　　without catalyst, 0.497 cc. per g.
　　with 20% catalyst, 0.255 cc. per g.
　Macropore volume—
　　without catalyst, 0.024 cc. per g.
　　with 20% catalyst, 0.090 cc. per g.

Other suitable carriers are:

Chabazite: (Natural zeolite):
　Inner surface, 430.0 square meters per gram.
　mean pore radius, 11.7 Angstrom units.
　micropore volume, 0.252 cc. per gram.
Calcium aluminium silicate (synthetic):
　Inner surface, 459.0 square meters per gram.
　mean pore radius, 20.6 Angstrom units.
　micropore volume, 0.287 cc. per gram.
Amorphous zeolite (synthetic):
　Inner surface, 504 square meters per gram.
　mean pore radius, 39.0 Angstrom units.
　micropore volume, 0.869 cc. per gram.

By neutral range in which the hydrogenation according to this invention is to be carried out there is to be understood a range extending from $pH=5$ to $pH=9$, preferably from $pH=6$ to $pH=8$.

A catalyst is especially suitable which contains about 10% of nickel, 5% of copper and 1% manganese on aluminiumoxide as a carrier. The neutral range during the hydrogenation is maintained by the use of neutral carriers. Carriers for which, when suspended in water, a pH value of 5 to 9 has been measured are suitable as neutral carriers in the sense of the invention.

The hydrogenation is carried out in the usual way continuously or discontinuously with hydrogen at temperatures of 50° to 200° C., preferably at 90° to 120° C., and at increased pressure, for example 50 to 350 atmospheres, preferably 150 to 250 atmospheres.

It is also possible to work in the presence of solvents or diluents, for example saturated aliphatic hydrocarbons with 6 to 8 carbon atoms, cycloaliphatic hydrocarbons, such as cyclohexane or methylcyclohexane, or aromatic or alkylaromatic compounds, such as benzene or toluene, which are not hydrogenated under the reaction conditions used. If the hydrogenation is carried out in large apparatus, it is advantageous to use cyclo-octane as a diluent. The working up of the reaction product is thereby considerably simplified.

In the discontinuous manner of operation, the cyclo-octatetraene is placed for example in a stirring autoclave or rolling bomb together with 3 to 20% by weight of catalyst with reference to the initial material to be hydrogenated, and hydrogen forced in for example up to about 100 atmospheres, preferably after a rinsing with nitrogen or hydrogen. Then the reaction vessel is heated to the reaction temperature, for example to 120° C. At the rate at which the hydrogen is used up in the hydrogenation, fresh hydrogen is continuously forced in until the absorption is ended. After cooling the reaction vessel, the reaction mixture is removed and worked up in manner known per se. The reaction mixture is free from the bicyclic isomers of cyclo-octane and therefore readily separated with the usual distillation plant.

In the continuous method of operation it is suitable to work in a high pressure trickling chamber with a fixed catalyst bed. For carrying out the reaction continuously, the same reaction conditions, i.e. temperature and pressure, hold good as in the discontinuous method. The hydrogen is preferably led in circulation by means of a gas circulating pump. In this embodiment the circulating hydrogen also serves for leading away the amount of heat set free by the exothermic reaction. The withdrawal of heat by the hydrogen circulation can if desired be enhanced by the interposition of a cooler. It is advantageous to introduce the hydrogen and the initial mixture to be hydrogenated, for example cyclo-octatetraene in a solvent or cyclo-octatetraene alone, separately or together from the top into the reaction chamber and then lead them in cocurrent through the catalyst zone. The hydrogenated mixture is withdrawn from the reaction chamber at the bottom and preferably cooled prior to its introduction into a stripper. The advantage of the process lies above all in the fact that inactivation of the catalyst, especially in the continuous method of operation, by clogging is avoided. The catalysts have a life of more than a year. A temporary subsidence of the activity of the catalysts can be met by regenerative treatment with hydrogen at 300° to 380° C., especially at 350° C.

In carrying out the process continuously, the withdrawal of heat by the hydrogen circulation can be assisted by carrying out the reaction in the presence of a solvent which is also led in circulation. By the possibility of a strict temperature maintenance it is possible to increase the throughput in the process without local overheating of the catalyst being observed.

The following examples will further illustrate this invention but the invention is not restricted to these examples.

Example 1

5 liters of cyclo-octatetraene which contains about 1% of styrene and 1 to 2% of benzene are pumped per hour into the top of a high pressure chamber of 30 liters capacity which is charged with a hydrogenation catalyst consisting of 15% of nickel, 5% of copper, 1% of manganese on aluminum oxide strings, of which the pH value amounts to 7.0. Hydrogen is pumped through the apparatus at 300 atmospheres by a gas circulating pump, the amount of hydrogen being such that the reaction temperature is kept at 95° to 100° C. The hydrogen used up, about 500 liters per hour, is continuously replaced, 5 liters of cyclo-octane (with 1% of ethylbenzene and 1 to 2% of benzene) are obtained per hour. The hydrogenation product is distilled at normal pressure. After a small first running of benzene and ethylbenzene, the cyclo-octane distills over at 151° to 152° C. at 160 torr pressure. The freezing point amounts to 14.2 to 14.6° C.; the yield is quantitative.

Example 2

A high pressure chamber of 3 liters capacity is charged with a hydrogenation catalyst which contains 12% of nickel, 2% of copper and 2% of manganese applied to aluminium oxide strings. 400 cubic centimeters of cyclo-octatetraene are pumped into the top of the chamber per hour. Hydrogen is pumped in circulation through the apparatus at a pressure of 200 atmospheres. The reaction temperature is kept at 110° C. The amount of hydrogen used up, about 350 liters per hour, is continuously furnished subsequently. 400 cubic centimeters of cyclo-octane are obtained per hour with a melting point of 10.0 to 12.5° C. By distillation at normal pressure there is obtained, after a small first running, pure cyclo-octane having a boiling point of 151° C. and a melting point of 14.1° to 14.5° C.

Example 3

A high pressure chamber of 3 liters capacity is charged with a rigidly-arranged catalyst which contains 15% of nickel, 3% of copper and 2% of chromium applied to aluminium oxide strings and which has a pH value of 6.9 to 7.0. 500 cubic centimeters of cyclo-octatetraene are pumped in per hour into the top of the chamber and led together with hydrogen under a pressure of 180 atmospheres down through the catalyst zone. By leading the hydrogen in circulation, the heat of reaction can be withdrawn to such an extent that the temperature does not exceed 100° to 110° C. The hydrogen used up, about 500 liters per hour, is continuously replaced. The hydrogenation mixture is distilled at normal pressure and there is obtained, after a slight first running, cyclo-octane with a boiling point of 151° C. at 760 torr pressure and a melting point of 14.2° to 14.5° C. in an almost quantitative yield.

We claim:

1. A process for the production of cyclo-octane by catalytic hydrogenation of cyclo-octatetraene at 50° C. to 200° C. and at a pressure of 50 to 350 atmospheres which comprises carrying out the hydrogenation in the neutral range in the presence of a nickel-copper catalyst which contains a metal selected from the group consisting of manganese and chromium and which is applied to a neutral and finely-pored carrier.

2. A process as claimed in claim 1 wherein the hydrogenation is carried out in the presence of a solvent.

3. A process for the production of cyclo-octane by catalytic hydrogenation of cyclo-octatetraene at 50° to 200° C. and at a hydrogen pressure of 50 to 350 atmospheres, which comprises carrying out the hydrogenation in the neutral range in the presence of a nickel-copper catalyst which contains 10 to 20% of nickel and 1 to 8% of copper as well as 0.5 to 5% of a metal selected from the group consisting of manganese and chromium and which is applied to a neutral and finely-pored carrier.

4. A process as claimed in claim 3 wherein the hydrogenation is carried out in the presence of a solvent.

5. A process for the production of cyclo-octane by catalytic hydrogenation of cyclo-octatetraene at 50° to 200° C. and at a hydrogen pressure of 50 to 350 atmospheres which comprises carrying out the hydrogenation in the neutral range in the presence of a nickel-copper-manganese catalyst which contains 15% of nickel, 5% of copper and 1% of manganese on aluminium oxide as a carrier.

6. In a method of producing cyclo-octane by catalytic hydrogenation of cyclo-octatetraene at elevated temperature and increased pressure, the improvement which comprises carrying out the hydrogenation in the neutral range in the presence of a nickel-copper catalyst which contains a metal selected from the group consisting of manganese and chromium and which is applied to a neutral and finely-pored carrier.

References Cited in the file of this patent

UNITED STATES PATENTS

| | | |
|---|---|---|
| 2,106,735 | Gwynn | Feb. 1, 1938 |
| 2,360,555 | Evans et al. | Oct. 17, 1944 |

OTHER REFERENCES

Ipatieff: National Petroleum News, Aug. 7, 1940, pages 280–282.

Reppe et al.: Annalen der Chemie, vol. 560, page 39 (1948), abstracted in Chem. Abs., vol. 43, 6194i.

UNITED STATES PATENT OFFICE

CERTIFICATE OF CORRECTION

Patent No. 2,903,492  September 8, 1959

Otto Schlichting et al

It is hereby certified that error appears in the printed specification of the above numbered patent requiring correction and that the said Letters Patent should read as corrected below.

Column 3, line 55, for "160 torr" read -- 760 torr --.

Signed and sealed this 5th day of April 1960.

(SEAL)
Attest:

KARL H. AXLINE
Attesting Officer

ROBERT C. WATSON
Commissioner of Patents